UNITED STATES PATENT OFFICE.

LUDWIG G. HEGI, OF PHILADELPHIA, PENNSYLVANIA, ASSIGNOR OF ONE-HALF HIS RIGHT TO GUSTAVUS ADOLPHUS BINKERT, OF SAME PLACE.

IMPROVEMENT IN STARCH COMPOUNDS.

Specification forming part of Letters Patent No. 214,910, dated April 29, 1879; application filed February 24, 1879.

*To all whom it may concern:*

Be it known that I, LUDWIG GUSTAV HEGI, of Philadelphia, in the county of Philadelphia and State of Pennsylvania, have invented new and Improved Starch Composition for Rendering Fabrics Uninflammable, of which the following is a specification.

The subject of my invention is a compound to be used with starch for application to cotton and linen fabrics to render them uninflammable.

To this end I take of commercial starch fifty-seven parts, by weight. With this I mix thirty-two parts, by weight, of sulphate of ammonia. The moisture of the above compound is then expelled by heat. In order to neutralize the destructive effects of the ammonia upon colors in the fabric, I add ten parts, by weight, of refined sugar, into which one part, by weight, of acetic acid has been introduced. The sugar soaked with the acetic acid, as stated, is thoroughly and intimately mixed with the starch and ammonia composition.

A starch thus compounded can be used in the same manner as ordinary starch without any greater or special care. Any fabric to which it is applied is rendered non-combustible, and no injury to the fabric or colors occurs.

The proportionate quantity of my chemical compound is slightly varied, according to the particular starch to which it is applied.

Having thus described my invention, the following is what I claim, and desire to secure by Letters Patent:

The composition of starch, sulphate of ammonia, sugar, and acetic acid, substantially as and for the purposes specified.

LUDWIG GUSTAV HEGI.

Witnesses:
ROBERT H. SIMPERS,
J. LINCOLN STEVENSON.